United States Patent [19]
Lai et al.

[11] Patent Number: 5,596,745
[45] Date of Patent: Jan. 21, 1997

[54] SYSTEM AND PROCEDURE FOR CONCURRENT DATABASE ACCESS BY MULTIPLE USER APPLICATIONS THROUGH SHARED CONNECTION PROCESSES

[75] Inventors: Meichen Lai; Tony Kuen Lee; Jenny Y. K. Nishimura, all of San Jose; Gerda R. Shank, San Francisco, all of Calif.

[73] Assignee: International Business Machines Corporation, Armonk, N.Y.

[21] Appl. No.: 242,939

[22] Filed: May 16, 1994

[51] Int. Cl.$^6$ ............................ G06F 17/30; G06F 15/16
[52] U.S. Cl. ...................... 395/614; 395/200.2; 395/413; 395/683; 364/282.4; 364/DIG. 1; 364/283.4
[58] Field of Search ................................ 395/54, 62, 153, 395/158, 159, 161, 425, 600, 650, 700, 750, 775, 800, 413

[56] References Cited

U.S. PATENT DOCUMENTS

| | | | |
|---|---|---|---|
| 4,480,304 | 10/1984 | Carr et al. | 364/726 |
| 5,265,245 | 11/1993 | Nordstrom et al. | 395/600 |
| 5,293,600 | 3/1994 | Vriezen | 395/479 |
| 5,297,279 | 3/1994 | Bannon et al. | 395/600 |
| 5,317,742 | 5/1994 | Bapat | 395/700 |
| 5,426,747 | 6/1995 | Weinreb et al. | 395/413 |
| 5,504,885 | 4/1996 | Alashqur | 395/600 |

OTHER PUBLICATIONS

W. Edwards et al., "Synchronous Method for Allowing Single Process Applications to Use Concurrent Database Connections", IBM Technical Disclosure Bulletin, vol. 36 No. 10, Oct. 1993 (pp. 183–184).

W. Edwards et al., "Asynchronous Method for Allowing Single Process Applications to Use Concurrent Database Connections", IBM Technical Disclosure Bulletin, vol. 36 No. 10, Oct. 1993 (pp. 615–619).

"Implementation of an Object–Oriented Front–end to a Relational Database System", IEEE Region 10 Conference on Computer and Communication Systems, Sep. 1990, Hong Kong Kisworo et al.

*Primary Examiner*—Wayne Amsbury
*Assistant Examiner*—Hosain T. Alam
*Attorney, Agent, or Firm*—Baker, Maxham, Jester & Meador

[57] ABSTRACT

A system for managing database connections between concurrent user applications and a plurality of databases in a database processing system. This method minimizes the number of connections made to a database by allowing such connections to be shared by multiple applications. The concept of a shared versus exclusive connection is introduced and, depending on the user application, a connection manager automatically routes a database access request through either an existing shared connection or an exclusive connection. A single database access object is introduced that includes two types of methods for connecting to a specified database in two different simultaneous paths. First, a shared connection through a catalog server process is made to process schema query requests for definition retrieval. Secondly, another connection is made to retrieve and manipulate data from the database responsive to SQL execution requests. Importantly, the SQL execution path itself may be either exclusive or shared with other associated database access objects requesting SQL execution in the same database.

33 Claims, 3 Drawing Sheets

SYSTEM AND PROCEDURE FOR CONCURRENT DATABASE ACCESS BY MULTIPLE USER APPLICATIONS THROUGH SHARED CONNECTION PROCESSES

BACKGROUND OF THE INVENTION

1. Field of the Invention

This invention relates generally to database server systems for managing access requests from concurrent user application programs and specifically to an efficient database connection management system employing shared connection objects each for concurrent connection of a plurality of user applications to a single database.

2. Description of the Related Art

In a data processing system complex servicing many databases and many concurrent users, a user application (UA) demands access to a specified database by issuing a database access request. Such requests may include, for instance, simple catalog lookup requests, herein denominated as database "schema queries", or transactions and combinations of transactions, herein denominated "units of work" (UOWs) that operate to both read and change specified records in the database.

The state of the art and data processing systems supporting multiple concurrent processes can be appreciated with reference to, for instance, *An Introduction to Operating Systems*, Harvey M. Deitel, 2nd ed., Addison-Wesley Publishing Company, Inc., 1990, (N.B., Ch. 3, "Process Concepts"). Also, reference is made to *Computer Architecture Parallel Processing*, Kai Hwang, et al., McGraw-Hill, Inc., 1984 (N.B., Ch. 8 "Multiprocessing Control and Algorithms") and *The Design of the UNIX Operating System*, Maurice J. Bach, Prentice-Hall, Inc., 1986 (N.B., Ch. 7 "Process Control" and Ch. 12 "Multiprocessor Systems").

Whenever a UA requests access to a particular database, a "connection" step is necessary to permit the corresponding Data Base Management System (DBMS) to allocate processing resources for servicing the database access request. Because a DBMS may not generally support multiple active connections to a specified database (e.g., DB2 for OS/2), overall system performance may deteriorate when a UA requires either (a) support for concurrent access to many databases, or (b) support for multiple connections to a specified database.

For example, if the UA must display information from different databases, responsive to user input, the UA may need to connect, access and disconnect from many different databases at various times. Also, if the UA is managing many different reports derived from the same database, several concurrent connections to that same database may be useful for optimizing reporting efficiency. Even where the DBMS supports multiple concurrent active connections, the procedure for establishing each such connection consumes substantial processor resources, especially if the database to be connected is a remote database. For instance, DB2 for OS/2 does not support multiple active connections to a specified database within a single process, requiring the spawning of multiple server processes to accomplish this.

Although the reconnection overhead burden is not a major problem in traditional database systems wherein UAs work with a single database, modern client/server environments introduce generalized client database user applications that support multiple database servers, requiring many concurrent accesses to different databases. One solution available for operating systems that support multiple processes is to spawn a new server process for each new database connection for UAs requiring multiple active database connections. The new server process handles all interaction for that particular connection between the UA and the database of interest and the UA's main process continues to service the user interface and display. Although this arrangement permits the UA to maintain multiple active connections to a single database, it does nothing to alleviate the significant processing overhead required to maintain each new connection and actually adds an additional performance burden for spawning each new process.

There is accordingly a clearly-felt need in the art for a method that maintains multiple concurrent active connections between a single or multiple databases and a user application without incurring new process and connection creation processing overhead responsive to every database access request. The related unresolved problems and deficiencies are clearly felt in the art and are solved by this invention in the manner described below.

SUMMARY OF THE INVENTION

This invention introduces the concept of a shared database connection process in a client-server system environment. A new Database Access (DBA) object is introduced that provides embedded class methods for separately but concurrently supporting both schema retrieval and Standard Query Language (SQL) execution requests. Two new types of servers executing in separate processes are introduced to service the DBA object of this invention. One of these types of server processes can be shared between concurrent DBA objects. Depending on the DBA class method, the necessary linkage to a database is assembled under the control of a Connection Manager (CM), which refers to a Data Base Connection Table (DBCT) maintained in memory to track the creation and sharing of all such server processes.

It is an objective of the method of this invention to minimize the necessary number of database connections created in a multiple user environment. It is a feature of this invention that user application (UA) connections to databases can be shared by many concurrent UAs. It is another feature of the method of this invention that exclusive database connections are available for SQL execution requests requiring database updates and modification.

It is an advantage of the method of this invention that a shared connection can be used to read database schema information that does not result in modification of the database. It is yet another advantage of the method of this system that shared database connections may also be used to process SQL execution requests that modify the database when so requested by the UA client.

The exclusive server process of this invention has a dedicated connection to a specific database and a dedicated connection to a DBA object of this invention, which is sponsored by a single UA. The shared server process of this invention has a dedicated connection to a specific database and is available for connection upon demand to any number of DBA objects of this invention when such DBA objects have permission to share such server process from a single sponsoring UA. A special shared server process ("catalog server process") for schema retrieval is introduced by this invention. The catalog server process has a dedicated connection to a specific database and is available for connection to any DBA object responsive to schema retrieval requests only. It is thus an advantageous feature of this invention that a single shared schema server process is sufficient for each database.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENT

Figure 1:
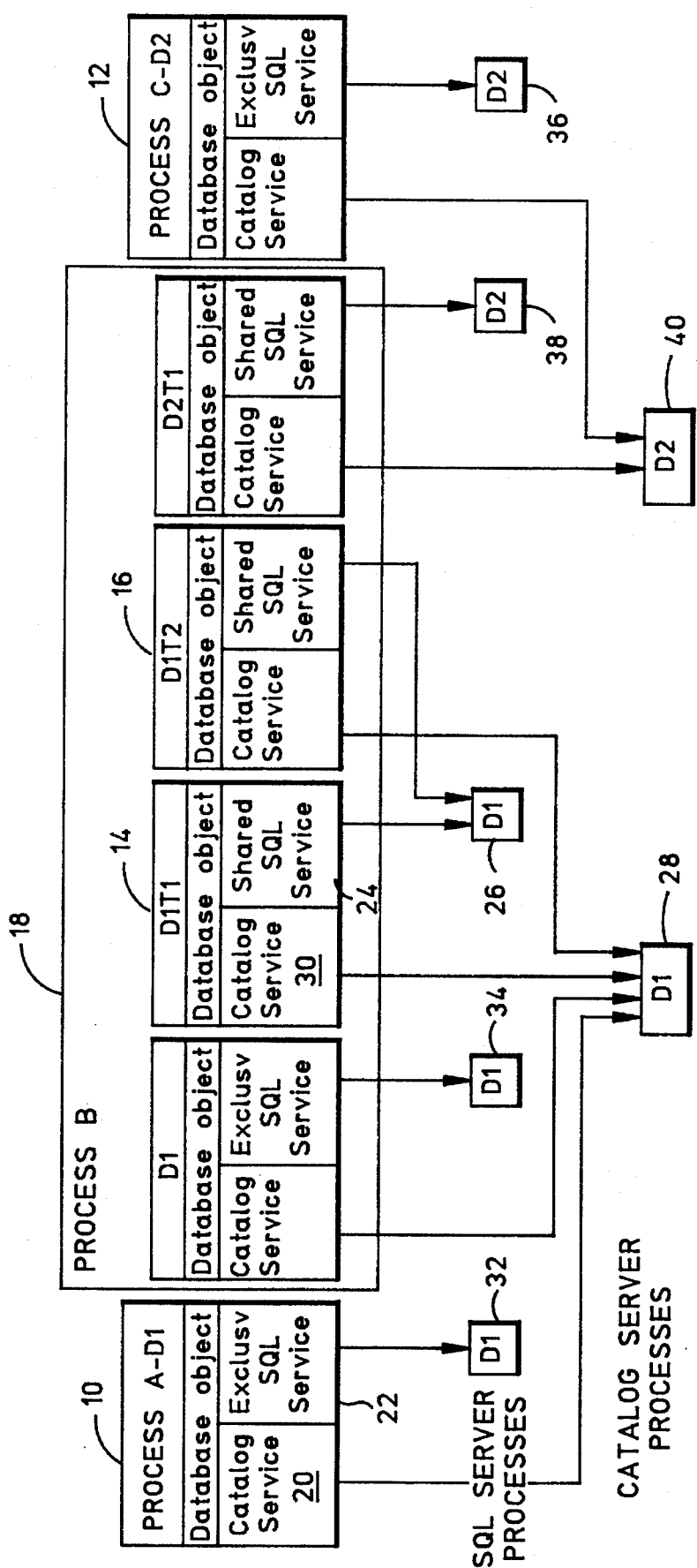
FIG. 1 is a functional block diagram of a process model exemplifying the system of this invention.

FIG. 1 shows an example of a process model employing the objects and processes of this invention for concurrent access to multiple databases in a database processing system. The model in FIG. 1 includes a plurality of objects, which are known in the art to comprise a data structure definition and its defined procedures in a single structure. Objects are instances of a "class", each instance having its own private instance variables. The "class definition" defines the properties of the object in that class. The procedures embedded in an object (also denominated "methods") are activated by "messages" sent to the object by another object. Thus, as is well-known in the art, the basic control structure in an object-oriented programming system exemplified by the process structure of FIG. 1 is message passing. Both data and processing requirements are embedded in the class definition of an object and the processing is accomplished through message exchanges between objects.

Accordingly, each of the objects and processes shown in FIG. 1 are physically contained in a data storage means within a computer processing system.

FIG. 1 shows a plurality of Database Access (DBA) objects, exemplified by the exclusive DBA object 10 for database D1 in process A and the exclusive DBA object 12 for the database D2 in process C. Also shown are "associated" DBA objects exemplified by DBA objects 14 and 16 for database D1 in process B. For exemplary purposes only, DBA objects 10 and 12 belong to two different processes and DBA objects 14 and 16 are shown together with a plurality of other such DBA objects in one process 18.

The DBA object of this invention provides a plurality of "methods" to support schema retrieval and execution of Standard Query Language (SQL) Units Of Work (UOWs). When a User Application (UA) requires access to a specific database, the UA either creates a DBA object associating it with the specific database or uses such DBA object created earlier. With the DBA object, the UA may then access the specific database using the methods embedded in the DBA object, which are serviced by the servers of this invention executing in separate processes.

For example, consider DBA object 10 in FIG. 1. DBA object 10 names database D1 and includes embedded schema retrieval methods 20 for accessing database D1 to retrieve catalog information. DBA object 10 also includes embedded SQL execution methods 22 for servicing SQL UOW executions. In FIG. 1, SQL service methods 22 is denominated "exclusive" SQL execution methods, which herein denotes that DBA object 10 requires access to database D1 through an exclusive server process that is not shared with any other DBA object. All other DBA objects shown in FIG. 1 also contain catalog service methods and SQL service methods embedded within the class. However, these other DBA objects, exemplified by DBA object 14, may contain "shared" SQL service methods, exemplified by shared SQL execution methods 24 in DBA object 14. Methods 24 permit DBA object 14 to share a SQL server process with other "associated" DBA objects, such as DBA object 16, to access a single database (D1).

Thus, requests from associated DBA objects 14 and 16 are serviced by either of two types of server processes, embodied as the shared SQL server process 26 and the catalog server process 28. Note that, for instance, DBA object 14 simultaneously forwards schema query messages to database D1 from catalog service methods 30 through catalog server process 28 and executes SQL UOWs in database D1 from shared SQL service methods 24 through shared SQL server process 26. With this invention, each DBA access object employs concurrent methods for (a) reading schema information such as database catalog tables and columns and (b) executing SQL UOWs to retrieve and manipulate data from the database. These concurrent methods operate with separate concurrent processes, exemplified by processes 26 and 28.

The several types of server processes shown in FIG. 1 are now discussed. The exclusive SQL server process, exemplified by processes 32 and 34 is coupled to a specific database (D1) for the exclusive use of the client DBA object. Exclusive SQL server processes 32 and 34 each have dedicated connections to database D1. The exclusive SQL server process 36 has a dedicated connection to database D2. All such exclusive SQL server processes also have dedicated connections to their client DBA object, substantially as shown.

The shared SQL server processes 26 and 38 and the catalog server processes 28 and 40 also have dedicated connections to the specified database but each may be shared by a plurality of DBA objects requiring access to the specified database. Thus, for instance, catalog server process 28 has a single dedicated connection to database D1 that is shared among four DBA object clients. In fact, the system of this invention requires only one catalog server process for each underlying database, which is then shared by all DBA objects requiring schema retrieval from the database, because no changes are made to the database. For SQL execution requests, the system of this invention provides the UA with the option of specifying either a shared server or an exclusive server. The UA implements this specification by creating a new DBA object or calling an existing DBA object for database access through an exclusive SQL server process or by creating or calling a DBA object for accessing the database through a shared SQL server process.

The UA specification decision raises several implications. For instance, an exclusive SQL server process offers a dedicated DBA object connection to the database for SQL UOW execution only, relying on a shared catalog server process for schema retrieval. This avoids any interference with transactions from other DBA objects when issuing a transaction commit/rollback. Specifying the appropriate DBA object having methods for connecting to an exclusive SQL server eliminates any possible wait for access to the SQL server process and also eliminates possibility of deadlocks. However, specifying another DBA object with methods for connecting to a shared SQL server creates an additional connection to the database, with attendant system overhead.

Specifying a shared SQL server process avoids proliferation of connections to the database for SQL UOW executions. However, to avoid interference with transactions from other DBA objects during commit/rollback of a transaction, the UA must explicitly issue demarcation calls around every UOW to ensure serialization. Internally, the DBA object of this invention uses startTransaction() and endTransaction() messages to demark UOW boundaries and ensure serialization of transactions and transaction groups in the shared SQL server process. The advantage of specifying a shared SQL server process is the minimization of system database connection overhead. The disadvantage of using DBA objects with shared server access methods, such as objects 14 and 16 in FIG. 1, is the possibility of deadlocking in cases where UAs do not properly mark UOW boundaries and the possibility of waiting for access to the shared SQL server process.

An exclusive SQL server process is spawned the first time a client UA invokes a method in a DBA object that requires exclusive SQL processing. Thus, there can exist as many as one such exclusive SQL process for each client DBA object in the system. This also means that, in the system of this invention, the UA may choose to use a separate exclusive SQL server process for each thread or may use a single exclusive SQL server process for multiple threads by manipulating the data routing among the threads. Parenthetically, the UA may also define a single UOW as including a plurality of SQL processing requests or transactions.

A shared SQL server process is spawned when the first UA invokes a SQL execution request in a DBA object that requires shared SQL processing. All client UA processes or threads for a specified database then process all SQL execution requests through the same shared SQL server process by way of the corresponding client DBA objects. The client UA must now demark the beginning and end of each transaction or UOW before submitting an SQL execution request to any of the DBA objects to ensure serialization of concurrent UOWs at the shared SQL server process.

Only one catalog server process is necessary for each specified database because all UA processes and threads can communicate with the specified database through a single shared catalog server process for catalog lookup requests. The catalog server process is spawned the first time a UA submits to a DBA object a schema retrieval request requiring catalog lookup for the specified database. Once established, the catalog server process remains in service for all DBA objects requiring access to the specified database. Each request constitutes a complete UOW, thereby ensuring serialization.

Figure 2:
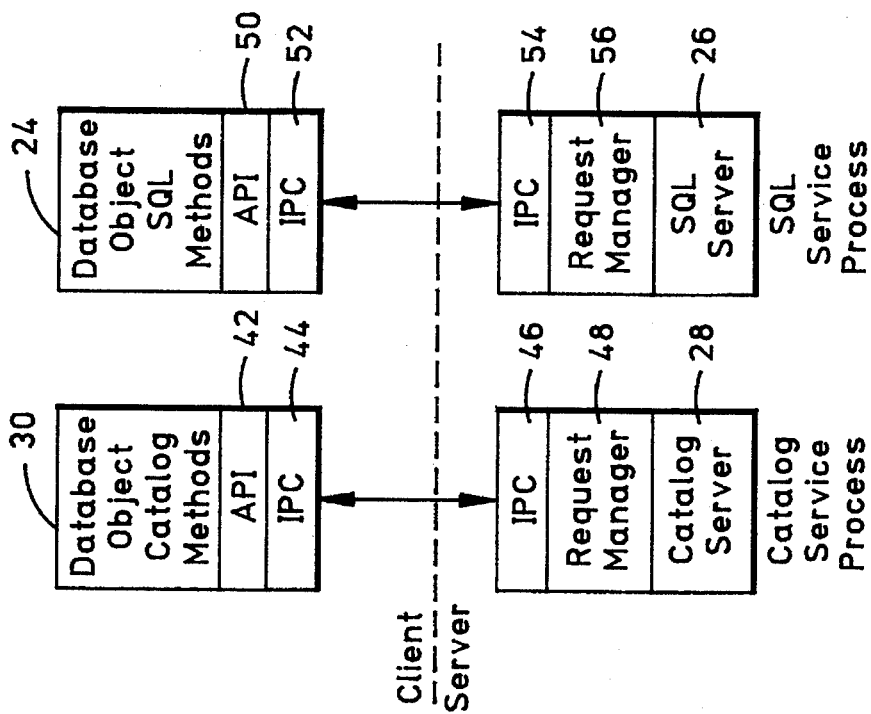
FIG. 2 is a functional block diagram illustrating the data access subcomponents associated with an illustrative embodiment of the system of this invention.

FIG. 2 illustrates a preferred subcomponent structure for the system of this invention. For exemplary purposes, DBA object 14 of FIG. 1 is shown in more detail. Catalog service methods 30 are coupled to process 28 and SQL service methods 24 are coupled to process 26, as shown in FIG. 1.

In FIG. 2, methods 24 and 30 each model a logical connection between DBA object 14 and the underlying database management system (DBMS) coupled to database D1. For every request from a UA (not shown), DBA object 14 first checks to determine whether a logical connection to the appropriate server process exists and, if not, calls a connection manager object (not shown) to establish the necessary logical connection by spawning a new server process or incrementing the related connection count for an existing server process in a database connection table (DBCT). The connection manager is responsible for determining whether a server process can be shared or a new server process must be spawned. The connection manager manages Database Connection Table (DBCT) in global shared memory, which stores information about all server processes. The connection manager and DBCT of this invention are discussed below in connection with FIGS. 4–5. If the logical connection already exists, DBA object 14 sends the request to the appropriate server process by way of an associated named pipe (managed by the interprocess communication service subcomponent) and waits for return messages providing the results of the request.

Figure 4:
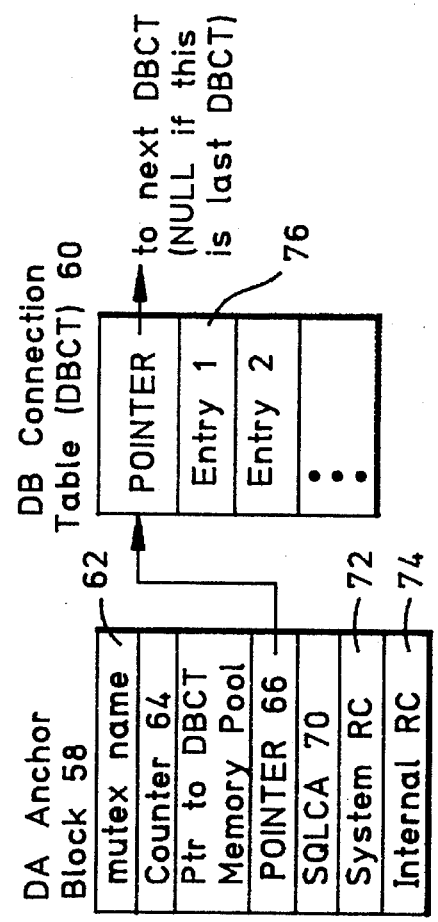
FIG. 4 is a functional block diagram illustrating the database connection table (DBCT) of this invention.
Figure 5:
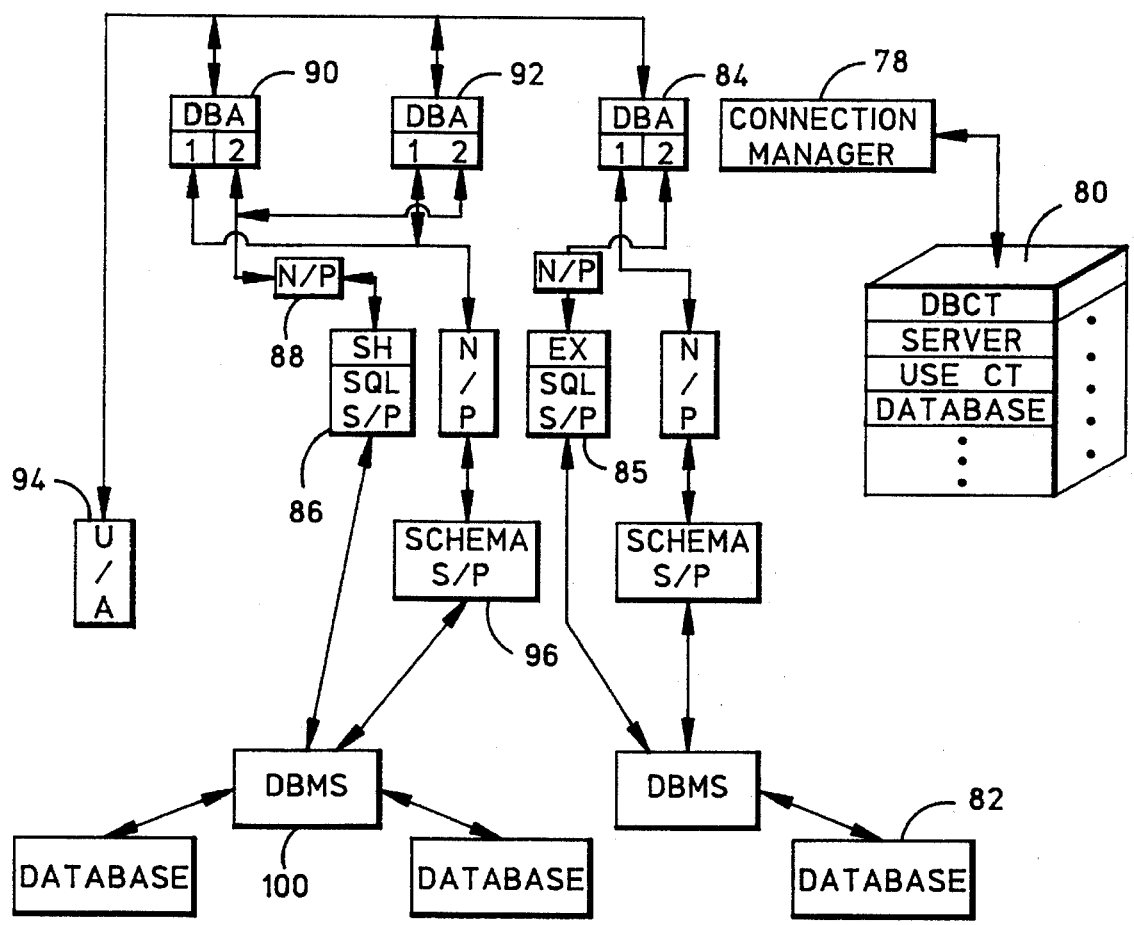
FIG. 5 is a functional block diagram of a data processing multisystem suitable for implementation of the method of this invention.

The rules for selecting the server process and for synchronizing database access request message traffic are now discussed. For all schema retrieval requests, catalog server process 28 is selected. Catalog server process 28 is shared across all instances of DBA objects referencing the same database name. Multiple requests to the same server process are serialized by operation of the server's named pipe in a manner known in the art. In FIG. 2, the application program interface (API) 42 automatically performs the activities necessary to link to catalog server process 28. API 42 accomplishes its assigned tasks through the interprocess communication (IPC) service subcomponent 44. API 42 translates the database access requests received from the UA to create message packages to be passed by way of a named pipe (IPC 44-46) from methods 30 to process 28. Also, when messages are returned from process 28 to methods 30, API 42 creates the output objects for the UA using data returned in a global shared memory (FIGS. 4–5).

IPC 44-46 is responsible for passing data and messages between the client methods 30 and the catalog server process 28. IPC 44-46 creates and manages the necessary "named pipes". IPC objects 44-46 receive a request packet from API 42 and then uses a named pipe to transfer this request packet to server process 28, which receives the request packet at the request manager (RM) 48. RM 48 processes the request packet and passes a response packet to IPC 46-44 for transfer through the named pipe to API 42.

Named pipes are used in the system of this invention because the processes represented by methods 30 and process 28 are unrelated. As is well-known in the art, a named pipe allows transfer of data between unrelated processes in a first-in-first-out (FIFO) fashion and also permits synchronization of process execution. Named pipes can remain permanently in the file system hierarchy and can be disconnected and reconnected to various processes by means of system file calls. Server process 28 creates the named pipe managed by IPC 46-44. The named pipe is local and duplexed to allow bidirectional data flow. It also blocks read or write operations in "wait" mode until data is available to be read or enough room is available for the data to be written. Other named pipe characteristics may be specified as inputs.

Methods 30 in client object 14 send a request over the named pipe to server process 28, which processes the request and sends a response back. Server process 28 should then disconnect the named pipe, reconnect it and wait for the next request from object 14. In the case of the shared process 28, the named pipe is then disconnected from object 14 and reconnected to another DBA object requiring schema retrieval services. It is preferred that the client object 14 send a disconnect request to server process 28 to notify server process 28 when it may disconnect the named pipe from methods 30.

Similarly, SQL execution methods 24 in DBA object 14 communicate over a second named pipe to SQL server process 26 by way of API 50, client IPC 52, server IPC 54 and request manager 56. Because SQL server process 26 is a "shared" server process, the second logical path between methods 24 and server process 26 operates substantially as described above in connection with the first logical path between methods 30 and process 28. Specifically, when the second logical path can be shared, the named pipe (IPC 52-54) is disconnected and reconnected among the associated DBA objects, remaining fully linked to shared SQL server process 26. However, because the SQL UOW execution messages must be serialized, additional requirements are imposed on API 50 as is now discussed.

A SQL server is used for all SQL UOW execution requests from the client UA. Although an exclusive SQL server is generally desired because updates may have been made concurrently to the specified database and the UOW must associate only with the currently-used DBA object. In some situations the UA client may intend only short transactions against the specified database and may beneficially employ many DBA object instances against the same database, such as shown for process B in FIG. 1. For such applications, a shared SQL server exemplified by SQL server process 26 can be used subject to the following restrictions.

With a shared SQL server, all SQL requests must be made within a single transaction "scope". A transaction scope is demarcated using two methods embedded in DBA object 14, such as a begin Transaction() method and a end Transaction() method. The begin Transaction() method internally obtains a mutually exclusive (mutex) semaphore associated with shared SQL server process 26. This mutex semaphore is owned by one requester at a time and, upon endTransaction(), the mutex semaphore is released, becoming available for new ownership. By requiring every UA that uses the shared SQL server to make the requests within a transaction scope marked by acquisition and release of a mutually exclusive semaphore, all database accesses are thus serialized within single UOW scope, thereby permitting the use of a shared SQL server process of this invention.

When a DBA object is first created, the object constructor initializes the anchor block 58 and the DBCT 60 of this invention. FIG. 4 shows data access anchor block 58 and DBCT 60 residing in the global shared memory of the database processing system. Anchor block 58 is named to permit access by other concurrent processes. To protect the global data area from simultaneous access, a mutex semaphore 62 is used to serialize access similarly to the above discussion in connection with FIG. 2. During initialization, shared memory is allocated for the global data area and mutex semaphore 62 is created. Anchor block 58 contains some global data and pointers to other data, such as large database blocks moved to shared memory responsive to database access requests. It also contains a mutex semaphore counter 64, a pointer 66 to DBCT 60, a pointer 68 to the DBCT memory pool, the SQLCA data 70 related to SQL errors, the system return code (RC) 72 for system error, and the internal return code (RC) 74 identifying system error type. Fields 70–74 are used to save information about errors occurring during initialization of either the catalog or SQL server processes related to the client DBA object to which anchor block 58 is related.

If a process dies during ownership of mutex semaphore 62, no other process has access to mutex semaphore 62 thereafter and a new semaphore name must be created. Counter 64 is used together with a local process counter to handle the creation of new mutex semaphore names under such circumstances. The value held in counter 64 is part of the mutex semaphore name and, when a process attempts to use the mutex semaphore and finds the previous owner has died, a new name is generated in part by incrementing counter 64 by one. When another process uses mutex semaphore 62, it then finds its local counter to differ from global counter 64 and responsively resets the local counter to quickly open the new mutex semaphore.

Pointer 66 in FIG. 4 locates DBCT 60, which is the first such DBCT for the parent DBA object. When the connection manager (FIG. 5) determines that a new server process is required, the process is then spawned and is passed the following information when spawned: (a) the name of the database to which this server is connected; (b) a pointer to the empty entry (e.g. entry 76) in the DBCT to be filled out by this process after the spawning is successfully concluded; and (c) semaphores used to communicate with the connection manager regarding errors. The connection manager includes as an embedded subcomponent a request manager (RM) exemplified by RM 56 in FIG. 2. The RM subcomponent sets the connection entry in DBCT 60, exemplified by entry 76, during initialization of the server process and deletes entry 76 during termination of the related server process.

DBCT 60 keeps track of the database connections. It contains information about the connected database and both catalog server processes and SQL server processes. Each entry, exemplified by entry 76, preferably contains the name of the connected database, an identification entry for the connection, a usage count of the number of the associated DBA objects sharing the corresponding server process, the corresponding server process type, the share mode (exclusive or shared) of the corresponding server process, a callable name for the corresponding server process, and a flag indicating whether the entry has been "deleted".

Figure 3:
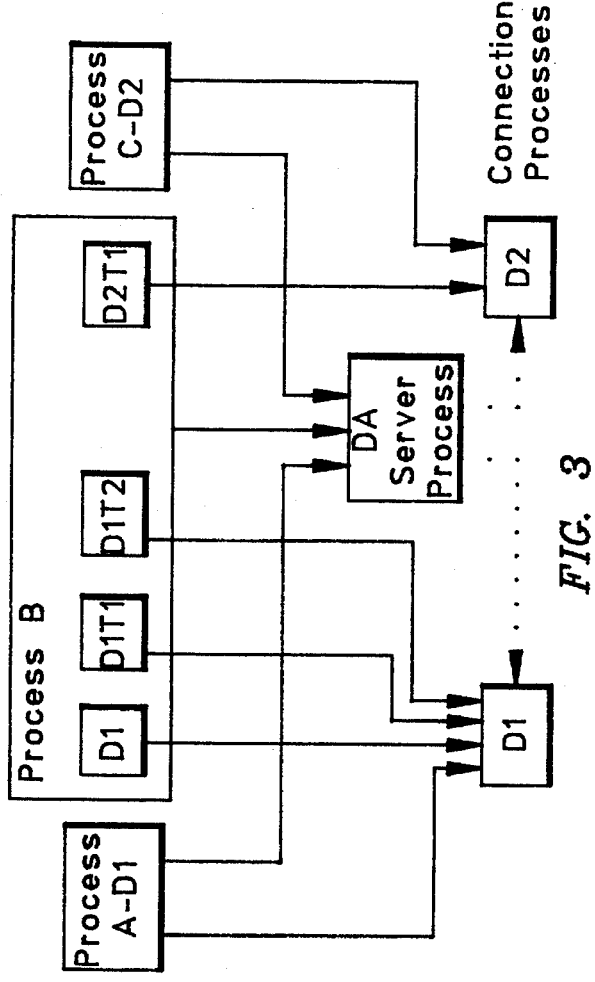
FIG. 3 is a functional block diagram illustrating an alternative process model considered and rejected by the inventors.

To better appreciate this invention, consider FIG. 3, which shows a data access process model that was considered and rejected by the inventors. Each DBA object in process B operates through a single process B connection. Although the process model in FIG. 3 offers some performance gain because it requires only one connection per database, it neither permits multiple SQL statements within a transaction nor does it permit selection of a SQL server process within a SQL window. Another alternative for supporting multiple statements in a single UOW through a single database connection process per database is to assign UOW management activities to the database connection process itself. Such a database connection process would check the requests coming in and process only those associated with a current unit of work, holding the ones that are associated with other transactions. Although considered, this alternative was also rejected by the inventors because of the enormous processing overhead required in the database connection process. Also, because the database connection process holds requests from all other clients until the current UOW is committed, database access requests from other clients may wait excessively in such a scheme. Thus, the mutex semaphore, UOW blocking scheme of this invention is preferred, as discussed above in connection with FIGS. 2 and 4.

FIG. 5 illustrates the system of this invention by showing a plurality of objects linked together in a data storage means of a database processing system. A connection manager 78 is shown coupled to a DBCT 80, which records the connections and processes for each database, exemplified by database 82 and each database access object, exemplified by DBA object 84. Exclusive SQL server processes such as process 85 are directly linked through a named pipe to the client DBA object 84. Shared SQL server processes, exemplified by process 86, are also coupled through named pipes, such as named pipe 88, to the client DBA object 90. Named pipe 88 can be disconnected and connected between DBA objects 90 and 92, for instance. DBA objects 84, 90 and 92 are all created responsive to data access requests from a single user application (UA) 94. All server processes, including schema retrieval (catalog server) processes, exemplified by process 96, are created responsive to database access requests from DBA objects such as object 92. Each server process, such as SQL server process 86, is coupled to the DBMS associated with the specified database. The database access server procedure can be understood with reference to FIG. 6.

Figure 6:
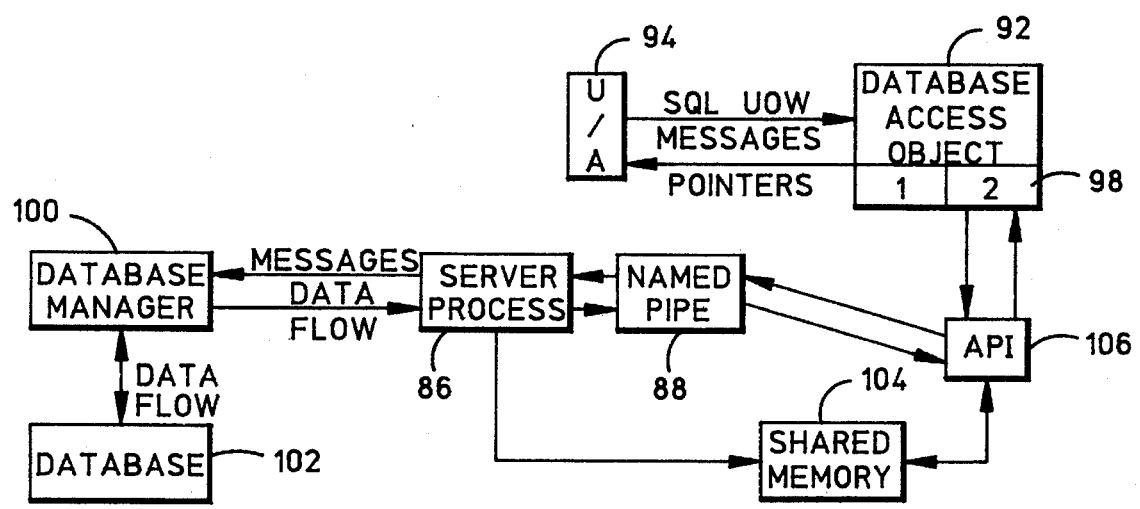
FIG. 6 is a functional block diagram illustrating the SQL UOW execution message and data flow for the method of this invention.

In FIG. 6, user application 94 sends database access requests including SQL UOW messages to DBA object 92. The second of the two internal connection methods in object 92 (SQL execution object 98) then selects and connects to SQL server process 86, which is spawned if necessary. Server process 86 causes the construction of named pipe 88, which is called by name (linked) through method 98. Method 98 passes messages through named pipe 88 to server process 86, which then independently sends messages to the database management system (DBMS) 100. DBMS 100 then moves data from database 102 responsive to the messages from server process 86. Server process 86 causes data from DBMS 100 to be moved to a shared memory region 104. This avoids tying up named pipe 88 with long data flow transfers. Instead, server process 86 merely passes a shared-memory pointer back to DBA object 92. Finally, user application 94, using the shared memory pointer, connects to shared memory 104 by way of DBA object 92 and API object 106 and manipulates the data in accordance with the UOW being executed.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. In an object-oriented database processing system having storage means for storing a plurality of databases and a plurality of user applications (UAs) for processing database access requests including schema queries and requests to execute standard query language (SQL) units of work (UOWs), for storing a plurality of catalog server processes, each linked to a respective database, and a plurality of SQL server processes, each linked to a respective database, and for storing a plurality of objects including a plurality of database access (DBA) objects for passing messages between said UAs and said databases, a method for accessing data in a first said database responsive to one or more said database access requests from a first said UA, said method comprising the steps of:

forming first logical paths between said plurality of catalog server processes and said plurality of DBA objects, and second logical paths between said plurality of SQL server processes and said plurality of DBA objects;

at least one of said first logical paths being shared among two or more DBA objects of the plurality of DBA objects;

followed by;
   (a) sending said database access requests from said first UA to a first said DBA object for passing messages between said first UA and said first database, said first DBA object including first schema retrieval methods and first SQL execution methods;
   (b) transferring schema query messages between said first schema retrieval methods of said first DBA object and said first database through a first said logical path; and
   (c) transferring SQL UOW execution messages between said first SQL execution methods of said first DBA object and said first database through a second said logical path.

2. The method of claim 1 wherein said first transferring step (b) comprises the steps of:
   (b.1) if not already existent, spawning a first catalog server process for retrieving data from said first database; and
   (b.2) connecting said first DBA object to said first catalog server process.

3. The method of claim 2 wherein said connecting step (b.2) comprises the steps of:
   (b.2.1) if not already existent, constructing a first named pipe object for transferring messages to and from said first catalog server process; and
   (b.2.2) linking said first named pipe object to said first DBA object.

4. The method of claim 3 wherein:
   said first logical path is shared among a plurality of said DBA objects by logically relinking said first named pipe object to each said DBA object responsive to schema query messages from said each DBA object.

5. The method of claim 4 wherein said linking step (b.2.2) comprises the steps of:
   (b.2.2.1) if said named pipe object is linked to a second said DBA object, completing a schema query message transfer between said second DBA object and said first database; and
   (b.2.2.2) disconnecting said first named pipe object from said second DBA object.

6. The method of claim 4 wherein said second transferring step (c) comprises the steps of:
   (c.1) if not already existent, spawning a first SQL server process for executing UOWs in said first database; and
   (c.2) connecting said first DBA object to said first SQL server process.

7. The method of claim 6 wherein said connecting step (c.2) comprises the steps of:
   (c.2.1) if not already existent, constructing a second named pipe object for transferring messages to and from said first SQL server process; and
   (c.2.2) linking said second named pipe object to said first DBA object.

8. The method of claim 7 wherein:
   said DBA object plurality includes a plurality of exclusive DBA objects and a plurality of associated DBA objects; and said second logical path is shared among a plurality of said associated DBA objects by logically relinking said second named pipe object to each said associated DBA object responsive to SQL UOW messages from said each associated DBA object.

9. The method of claim 2 wherein said second transferring step (c) comprises the steps of:
   (c.1) if not already existent, spawning a first SQL server process for executing UOWs in said first database; and
   (c.2) connecting said first DBA object to said first SQL server process.

10. The method of claim 1 wherein said second transferring step (c) comprises the steps of:
    (c.1) if not already existent, spawning a first SQL server process for executing UOWs in said first database; and
    (c.2) connecting said first DBA object to said first SQL server process.

11. The method of claim 10 wherein said connecting step (c.2) comprises the step of:
    (c.2.1) if not already existent, constructing a first named pipe object for transferring messages to and from said first SQL server process; and
    (c.2.2) linking said first named pipe object to said first DBA object.

12. The method of claim 11 wherein:
    said DBA object plurality includes a plurality of exclusive DBA objects and a plurality of associated DBA objects; and
    said second logical path is shared among a plurality of said associated DBA objects by logically relinking said second named pipe object to each said associated DBA object responsive to SQL UOW messages from said each associated DBA object.

13. The method of claim 12 wherein said linking step (c.2.2) comprises the steps of:
    (c.2.2.1) if said first named pipe object is linked to a second said DBA object, completing the transfer of a UOW execution message between said second DBA object and said first database; and
    (c.2.2.2) disconnecting said first named pipe object from said second DBA object.

14. The method of claim 1 wherein:
    said database processing system includes a plurality of said DBA objects coupled to a plurality of said databases through a plurality of said first and second logical paths; and
    at least one said second logical path is shared by a plurality of said DBA objects.

15. An object-oriented database processing system having a plurality of objects and a plurality of databases, said objects including a plurality of user applications (UAs) that make database access requests for processing schema queries and standard query language (SQL) unit of work (UOW) executions, said system comprising:
    data storage means for storing said data and objects;
    a plurality of database access (DBA) objects in said data storage means, each for receiving said database access requests for one said database from one said UA and having methods for exchanging schema retrieval messages with said one database over a first logical path and methods for exchanging SQL UOW execution messages with said one database over a second logical path;
    a plurality of catalog server processes in said data storage means, each linked to a respective one of said databases, for processing said schema queries responsive to messages exchanged with said DBA objects;
    at least one said database being linked to one said catalog server process that is shared by two or more said DBA objects;
    a plurality of SQL server processes in said data storage means, each linked to a respective one of aid databases, for processing said SQL execution requests responsive to messages exchanged with said DBA objects; and
    connection manager means in said data storage means for selecting and linking said catalog server processes to said DBA objects to form said first logical paths and for selecting and linking said SQL server processes to said DBA objects to form said second logical paths.

16. The system of claim 15, wherein said DBA object plurality includes:
    associated DBA objects, each having methods for exchanging said SQL UOW execution request messages with one said SQL server process over one said second logical path shared with other said associated DBA objects; and
    exclusive DBA objects, each having methods for exchanging said SQL UOW execution request messages with one said SQL server process over an exclusive said second logical path that is unavailable to other said DBA objects.

17. The system of claim 16 wherein said SQL server process plurality includes:
    one or more exclusive SQL server processes each linked to no more than one said exclusive DBA object; and
    one or more shared SQL server processes, each available for linkage to any of a plurality of said associated DBA objects.

18. The system of claim 17 wherein said connection manager means includes:
    exclusive link means for linking one said exclusive SQL server process to one said exclusive DBA object to form one said exclusive second logical path;
    shared link means for linking one said shared SQL server process to one said associated DBA object to form one said second logical path; and
    switching means for disconnecting one said shared SQL server process from a first said associated DBA object and for relinking said one shared SQL server process to a second said associated DBA object.

19. The system of claim 18 wherein said switching means includes:
    database connection table (DBCT) means in said data storage means for specifying the number of said DBA objects shared by each said shared SQL server process.

20. A computer program product for use in an object-oriented database processing system having a central processing unit and storage means for storing a plurality of databases and a plurality of user applications (UAs) for processing database access requests including schema queries and requests to execute standard query language (SQL) units of work (UOWs), for storing a plurality of catalog server processes, each linked to a respective database, and a plurality of SQL server processes, each linked to a respective database, and for storing a plurality of objects including a plurality of database access (DBA) objects for passing messages between said UAs and said databases, said computer program product comprising:
    a recording medium;
    means recorded on said medium for forming first logical paths between said plurality of catalog server processes and said plurality of DBA objects, and second logical paths between said plurality of SQL server processes and said plurality of DBA objects, at least one of said first logical paths being shared among two or more DBA objects of the plurality of DBA objects;

means recorded on said recording medium for directing said processing system to send database access requests from a first UA to a first said DBA object for passing messages between said first UA and a first database, said first DBA object including first schema retrieval methods and first SQL execution methods;

means recorded on said recording medium for directing said processing system to transfer schema query messages between said first schema retrieval methods of said first DBA object and said first database through a first logical path; and means recorded on said recording medium for directing said processing system to transfer SQL UOW execution messages between said first SQL execution methods of said first DBA object and said first database through a second logical path.

21. The computer program product of claim 20 further comprising:

means recorded on said recording medium for directing said processing system to spawn, if not already existent, a first catalog server process for retrieving data from said first database; and means recorded on said recording medium for directing said processing system to connect said first DBA object to said first catalog server process.

22. The computer program product of claim 21 further comprising:

means recorded on said recording medium for directing said processing system to construct, if not already existent, a first named pipe object for transferring messages to and from said first catalog server process; and means recorded on said recording medium for directing said processing system to link said first named pipe object to said first DBA object.

23. The computer program product of claim 22 wherein:

said first logical path is shared among a plurality of said DBA objects by logically relinking said first named pipe object to each said DBA object responsive to schema query messages from said each DBA object.

24. The computer program product of claim 23 further comprising:

means recorded on said recording medium for directing said processing system to completing a schema query message transfer between said second DBA object and said first database if said named pipe object is linked to a second said DBA object; and means recorded on said recording medium for directing said processing system to disconnect said first named pipe object from said second DBA object.

25. The computer program product of claim 23 further comprising:

means recorded on said recording medium for directing said processing system to spawn, if not already existent, a first SQL server process for executing UOWs in said first database; and means recorded on said recording medium for directing said processing system to connect said first DBA object to said first SQL server process.

26. The computer program product of claim 25 further comprising:

means recorded on said recording medium for directing said processing system to construct, if not already existent, a second named pipe object for transferring messages to and from said first SQL server process; and means recorded on said recording medium for directing said processing system to link said second named pipe object to said first DBA object.

27. The computer program product of claim 26 wherein:

said DBA object plurality includes a plurality of exclusive DBA objects and a plurality of associated DBA objects; and said second logical path is shared among a plurality of said associated DBA objects by logically relinking said second named pipe object to each said associated DBA object responsive to SQL UOW messages from said each associated DBA object.

28. The computer program product of claim 21 further comprising:

means recorded on said recording medium for directing said processing system to spawn, if not already existent, a first SQL server process for executing UOWs in said first database; and means recorded on said recording medium for directing said processing system to connect said first DBA object to said first SQL server process.

29. The computer program product of claim 20 further comprising:

means recorded on said recording medium for directing said processing system to spawn, if not already existent, a first SQL server process for executing UOWs in said first database; and means recorded on said recording medium for directing said processing system to connect said first DBA object to said first SQL server process.

30. The computer program product of claim 29 further comprising:

means recorded on said recording medium for directing said processing system to construct, if not already existent, a first named pipe object for transferring messages to and from said first SQL server process; and means recorded on said recording medium for directing said processing system to link said first named pipe object to said first DBA object.

31. The computer program product of claim 30 wherein:

said DBA object plurality includes a plurality of exclusive DBA objects and a plurality of associated DBA objects; and said second logical path is shared among a plurality of said associated DBA objects by logically relinking said second named pipe object to each said associated DBA object responsive to SQL UOW messages from said each associated DBA object.

32. The computer program product of claim 31 further comprising:

means recorded on said recording medium for directing said processing system to complete the transfer of a UOW execution message between said second DBA object and said first database if said first named pipe object is linked to a second said DBA object; and means recorded on said recording medium for directing said processing system to disconnect said first named pipe object from said second DBA object.

33. The computer program product of claim 20 wherein:

said database processing system includes a plurality of said DBA objects coupled to a plurality of said databases through a plurality of said first and second logical paths; and at least one said second logical path is shared by a plurality of said DBA objects.

* * * * *